United States Patent
Ishiodori et al.

(10) Patent No.: US 10,406,487 B2
(45) Date of Patent: Sep. 10, 2019

(54) HYDROPHILISED VINYLIDENE FLUORIDE-BASED POROUS HOLLOW FIBRE MEMBRANE, AND MANUFACTURING METHOD THEREFOR

(71) Applicant: Kuraray Co., Ltd., Kurashiki-shi (JP)

(72) Inventors: Arata Ishiodori, Jiaxing (CN); Kensaku Komatsu, Chiyoda-ku (JP); Youhei Yabuno, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 287 days.

(21) Appl. No.: 14/991,106

(22) Filed: Jan. 8, 2016

(65) Prior Publication Data

US 2016/0121273 A1    May 5, 2016

Related U.S. Application Data

(63) Continuation of application No. PCT/JP2014/068229, filed on Jul. 8, 2014.

(30) Foreign Application Priority Data

Jul. 18, 2013   (JP) ................................ 2013-149535

(51) Int. Cl.
   *B01D 71/34*       (2006.01)
   *B01D 69/08*       (2006.01)
   (Continued)

(52) U.S. Cl.
   CPC ......... *B01D 71/34* (2013.01); *B01D 67/0016* (2013.01); *B01D 69/02* (2013.01);
   (Continued)

(58) Field of Classification Search
   None
   See application file for complete search history.

(56) References Cited

U.S. PATENT DOCUMENTS

| | | | | |
|---|---|---|---|---|
| 4,810,384 A | * | 3/1989 | Fabre | ..................... B01D 71/34 210/500.23 |
| 5,834,107 A | | 11/1998 | Wang et al. | |

(Continued)

FOREIGN PATENT DOCUMENTS

| | | |
|---|---|---|
| CN | 101190401 A | 6/2008 |
| EP | 2 052 771 A1 | 4/2009 |

(Continued)

OTHER PUBLICATIONS

Machine translation of Komatsu (JP-05317664), 1993, pp. 1-9.*

(Continued)

*Primary Examiner* — Clare M Perrin
(74) *Attorney, Agent, or Firm* — Oblon, McClelland, Maier & Neustadt, L.L.P.

(57) ABSTRACT

Provided is a vinylidene fluoride porous hollow fiber membrane excellent in fouling resistance due to reduced organic substance absorbance, preferably having preferable pore structures to enable to have high permeability, high fractionation performance, and good process controllability. The membrane includes a vinylidene fluoride resin and 0.5 to 10% by weight of a hydrophilic resin, having a ratio Pi/Po of 2.5 to 50 where Pi and Po denote an average pore size on inner surface and an average pore size on outer surface, respectively, and having a pure water permeation rate satisfying the following formula:

$$(FLUX_d/FLUX_w) \times 100 \geq 40.0$$

wherein $FLUX_d$ represents a pure water permeation rate $(L/m^2/hr/98\ kPa)$ of the hollow fiber membrane in a dry state, and $FLUX_w$ represents a pure water permeation rate $(L/m^2/hr/98\ kPa)$ of the hollow fiber membrane in a wet state.

7 Claims, 8 Drawing Sheets

(EX. 1: SEM OF OUTER SURFACE)

(EX. 1: SEM OF INNER SURFACE)

(51) Int. Cl.
  *B01D 67/00*  (2006.01)
  *B01D 69/02*  (2006.01)
(52) U.S. Cl.
  CPC ........... *B01D 69/08* (2013.01); *B01D 69/087* (2013.01); *B01D 2325/02* (2013.01); *B01D 2325/022* (2013.01); *B01D 2325/20* (2013.01)

(56) References Cited

U.S. PATENT DOCUMENTS

| | | | |
|---|---|---|---|
| 6,110,309 | A | 8/2000 | Wang et al. |
| 6,146,747 | A * | 11/2000 | Wang .................... B01D 39/083 210/490 |
| 7,140,496 | B2 | 11/2006 | Nagoya et al. |
| 7,909,178 | B2 | 3/2011 | Ishiodori et al. |
| 8,931,647 | B2 | 1/2015 | Shiki et al. |
| 2004/0023017 | A1 | 2/2004 | Nagoya et al. |
| 2004/0050791 | A1 | 3/2004 | Herczeg |
| 2009/0101600 | A1 | 4/2009 | Shiki et al. |
| 2009/0148659 | A1 | 6/2009 | Ishiodori et al. |
| 2009/0283469 | A1 | 11/2009 | Ariji et al. |
| 2011/0210067 | A1 * | 9/2011 | Kato .................... B01D 61/147 210/634 |
| 2012/0085698 | A1 | 4/2012 | Yang et al. |
| 2012/0132583 | A1 | 5/2012 | Son et al. |

FOREIGN PATENT DOCUMENTS

| | | |
|---|---|---|
| JP | 5-317664 | 12/1993 |
| JP | 05317664 A * | 12/1993 |
| JP | 2000-505719 A | 5/2000 |
| JP | 2002-233739 | 8/2002 |
| JP | 2004-525755 | 8/2004 |
| JP | 2010-155204 A | 7/2010 |
| JP | 2012-525966 | 10/2012 |
| WO | WO 97/026134 A | 7/1997 |
| WO | WO 02/058828 A1 | 8/2002 |
| WO | WO 03/026779 A1 | 4/2003 |
| WO | WO 2007/119850 A1 | 10/2007 |
| WO | WO 2011/037354 A2 | 3/2011 |

OTHER PUBLICATIONS

Combined Office Action and Search Report dated Aug. 2, 2016 in Chinese Patent Application No. 201480040365.5 (with English translation of Search Report and English translation of categories of cited documents).
Allan F. M. Barton "CTC Handbook of Solubility Parameters and Other Cohesion Parameters", $2^{th}$ Ed., 1991, 18 pages.
Extended European Search Report dated Dec. 13, 2016 in Patent Application No. 14826026.8.
Fu Liu, et al., "Preparation of hydrophilic and fouling resistant poly(vinylidene fluoride) hollow fiber membranes", Journal of Membrane Science, vol. 345, 2009, pp. 331-339.
Singapore Search Report and Written Opinion dated Mar. 2, 2017 in Patent Application No. 11201600289U.
John Burke, "The Hildebrand Solubility Parameter" Solubility Parameters: Theory and Application, http://cool.conseryation-us.org/byauth/burke/solpar/solpar2.html, 1984, 5 pages.
Written Opinion dated Feb. 7, 2018 in Singaporean Patent Application No. 11201600289U, 7 pages.
Japanese Office Action dated Oct. 30, 2018 in Japanese Patent Application No. 2015-527268 (with unedited computer generated English translation), 5 pages.
Communication pursuant to Article 94(3) dated Apr. 20, 2018 in European Patent Application No. 14 826 026.8.
Office Action dated Jul. 3, 2018 in corresponding Japanese Patent Application No. 2015-527268 (with English Translation), 6 pages.
Examination Report dated Jan. 17, 2019 in Indian Patent Application No. 201647004959 with English translation.
Substantive Examination Adverse Report dated Jan. 28, 2019 in Malaysian Patent Application No. PI2016000043.
Decision of Grant dated Jan. 29, 2019 in Japanese Patent Application No. 2015-527268.
International Search Report dated Oct. 21, 2014 in PCT/JP2014/068229, filed Jul. 8, 2014 (with English Translation).
Eric A. Grulke "Solubility Parameter Values" Polymer Handbook, $4^{th}$ Ed., vol. 2, 1999, 42 pages.
Allan F. M. Barton "CRC Handbook of Solubility Parameters and Other Cohesion Parameters", $2^{nd}$ Ed., 1991, 18 pages.

* cited by examiner (EX. 1: SEM OF OUTER SURFACE)

(EX. 1: SEM OF INNER SURFACE)

(EX. 1: SEM OF CROSS-SECTION)

(EX. 5: SEM OF OUTER SURFACE)

(EX. 5: SEM OF INNER SURFACE)

(EX. 5: SEM OF CROSS-SECTION)

(COM. EX. 3: SEM OF OUTER SURFACE)

(COM. EX. 3: SEM OF INNER SURFACE)

(COM. EX. 3: SEM OF CROSS-SECTION)

HYDROPHILISED VINYLIDENE FLUORIDE-BASED POROUS HOLLOW FIBRE MEMBRANE, AND MANUFACTURING METHOD THEREFOR

CROSS REFERENCE TO THE RELATED APPLICATION

This application is a continuation application, under 35 U.S.C. § 111(a), of international application No. PCT/JP2014/068229, filed Jul. 8, 2014, which claims priority to Japanese Patent Application No. 2013-149535 filed Jul. 18, 2013, the entire disclosure of which is herein incorporated by reference as a part of this application.

FIELD OF THE INVENTION

The present invention relates to hydrophilic vinylidene fluoride resin porous hollow fiber membranes (hereinafter, sometimes abbreviated as "porous hollow fiber membranes") and a method of producing the same. The porous hollow fiber membranes are suitably applicable to fields of water treatment such as water purification, drinking water production, industrial water production, and wastewater treatment, to fields of food industry, and to other fields. The porous hollow fiber membranes according to the present invention are less adsorptive to organic substances in raw water so as to be excellent in fouling resistance, and have preferable pore structures to enable to have high permeability, high fractionation performance, and good process controllability.

BACKGROUND ART

Membrane separation techniques using a porous membrane having a selective permeability have made remarkable progress. The membrane separations are used in various fields such as production of drinking water, ultrapure water, drugs, and medicines, and sterilization and/or finishing of brewing materials or brewed products so as to achieve practical development in a series of purification system including separation, cleaning, sterilization, and others. In these fields, due to highly leveled requirements on fine treatment (advanced treatment) of water, safety improvement, and separation accuracy, development in porous membranes to respond such requirements has proceeded.

In water treatment applications such as water purification processing, since porous membranes to be employed in many cases are required to treat a large amount of water, the porous membranes are generally hollow fiber membranes that can increase effective membrane area per unit volume. Further, the hollow fiber membranes having increased water permeability can reduce necessary membrane area, can decrease installation cost due to smaller size of equipment, and can achieve advantages in view of membrane exchange costs and sizes of plant areas. However, there is a problem that water permeability of membranes gradually decreases along with continuous filtration operation due to membrane fouling by various substances contained in water to be treated.

Filtration of raw water rich in pollution substances generally causes sediment (clogging) of organic substances contained in the raw water on surface or internal portion of the membrane during continuous filtration. The sediment build-up increases filtration resistance of the membrane, resulting in deteriorated filtration capacity. Accordingly, the filtration operation is usually suspended in the middle of operation, and the membrane is washed by flushing to peel off the sediments with water at a high flow rate, by air-scrubbing to peel off the sediments by bubbles touched onto membranes, or by reverse-cleaning with flow of gas such as air or treated water into the opposite direction from filtration to clean the membrane. Furthermore, periodic chemical cleaning also can be performed in order to maintain high filtration capacity of membrane. Although flushing and air-scrubbing are effective in cleaning of membranes, conventional membranes cannot achieve satisfactory permeability because of high accumulation of sediments attached to the membrane over time even after being cleaned with these cleaning means.

Separation membranes containing vinylidene fluoride resin have been attracted attention as a material having high chemical resistance and high physical strength, and physical durability so as to have a tendency to expand the future applications. However, vinylidene fluoride resin membranes are easy to be fouled due to the hydrophobic material. Accordingly, it is necessary to avoid fouling (clogging) of the vinylidene fluoride resin membranes by organic substances.

So far, there is proposed a method of immersing a filtration membrane being composed of a vinylidene fluoride resin in an ethylene-polyvinyl alcohol copolymer solution in order to impart hydrophilicity to the filtration membrane (Patent Document 1: JP Patent Application Laid-Open No. 2002-233739). However, since the hydrophilic treatment by means of the immersion cannot achieve sufficient hydrophilization of the membrane to the internal portion, such immersed membrane does not maintain water permeability once in a dry state. As a result, the vinylidene fluoride resin membranes need to be kept immersed in a liquid or to be treated by a wetting operation before use, so as to cause problems in usage of the vinylidene fluoride resin membrane in view of cost as well as handleability.

DISCLOSURE OF THE INVENTION

In view of the above problems of the conventional technologies, an object of the present invention is to provide a vinylidene fluoride-based resin (simply refers as vinylidene fluoride resin) porous hollow fiber membrane usable in water treatment field such as water purification, drinking water production, industrial water production, and wastewater treatment, in fields of food industry, and in other fields. The vinylidene fluoride resin porous hollow fiber membranes have a reduced adsorption of organic substances in raw water so as to achieve excellent fouling resistance, and have preferable pore structures to achieve high permeability, high fractionation performance, and good process controllability.

As a result of extensive investigation to achieve the above-described objects, the inventors of the present invention found that a porous hollow fiber membrane having advantageous properties can be obtained by imparting hydrophilicity to not only membrane surfaces but also pore inner surfaces and by controlling pore structures so that the membrane has denser pores on the surface in contact to raw water (water to be treated) and coarser pores on the surface in contact to treated water. The porous hollow fiber membrane has advantageous properties such that the membrane is excellent in fouling resistance because of less adsorption of organic substances in raw water; and has improved permeability as well as fractionation performance. Based on these findings, the inventors accomplished the present invention.

That is, a first aspect of the present invention is a porous hollow fiber membrane including a vinylidene fluoride-based resin (simply refers as vinylidene fluoride resin), wherein the membrane contains a hydrophilic resin at a concentration of 0.5 to 10% by weight, has a ratio Pi/Po of 2.5 to 50 where Pi and Po denote an average pore size on inner surface (Pi) and an average pore size on outer surface (Po), respectively, and has a pure water permeation rate satisfying the following formula:

$$(FLUX_d/FLUX_w) \times 100 \geq 40.0$$

In the formula, $FLUX_d$ represents a pure water permeation rate (L/m²/hr/98 kPa) of the hollow fiber membrane in a dry state, and $FLUX_w$ represents a pure water permeation rate (L/m²/hr/98 kPa) of the hollow fiber membrane in a wet state.

Preferably, the vinylidene fluoride resin porous hollow fiber membrane may have a surface pore ratio of outer surface of 5% or higher and 40% or lower relative to total outer surface area of the porous hollow fiber membrane, and a fraction particle size (fraction particle diameter) of 0.01 µm or larger and 5.0 µm or smaller.

Preferably, the hydrophilic resin may be approximately uniformly distributed in a cross-sectional direction of the hollow fiber membrane.

A second aspect of the present invention is a method for producing a vinylidene fluoride resin porous hollow fiber membrane including: bringing a spinning liquid (spinning dope) containing a vinylidene fluoride resin, a solvent, inorganic particles, and an aggregater (aggregating agent), into contact with an external coagulating liquid and an internal coagulating liquid, wherein the internal coagulating liquid contains a hydrophilic resin at a concentration of 0.1 to 15% by weight based on the internal coagulating liquid and has a lower coagulating property than the external coagulating liquid.

In the production method, the spinning liquid extruded from a spinneret may preferably enter a dry spinning zone (a gap) and then an extruded fibrous material may be brought into contact with the external coagulating liquid.

In the production method, the spinning liquid may preferably have a three dimensional solubility parameter $\delta(s, c)$ of 21 to 33 $((MPa)^{1/2})$. The internal coagulating liquid may preferably have a three dimensional solubility parameter $\delta(i, c)$ of 23 to 35 $((MPa)^{1/2})$.

The present invention also encompasses any combination of at least two constituent elements disclosed in claims and/or description and/or drawings. For examples, the present invention encompasses any combination of two or more elements described in claims.

According to the first aspect of the present invention, incorporation of the hydrophilic resin at a concentration of 0.5 to 10% by weight in the vinylidene fluoride resin porous hollow fiber membrane enables to obtain a porous hollow fiber membrane that is hydrophilized not only on porous hollow fiber membrane surfaces but also on inner pore surfaces. Accordingly, the membrane has a reduced adsorption of organic substances in raw water, is excellent in fouling resistance, and has pure water permeation capacity even in a dry state. Moreover, according to an aspect of the present invention, the porous hollow fiber membrane has a porous structure in which an average pore size on inner surface of the hollow fiber membrane is larger than an average pore size on outer surface of the hollow fiber membrane. As a result, where raw water is filtrated with the porous hollow fiber membrane by feeding the raw water from the outer surface of the membrane, the outer surface having a small pore size can trap fine particles in the raw water so as to achieve high fractionation property. In the meantime, where the membrane has a pore structure in which pores have gradient increase in size from the outer surface toward the inner surface, the porous hollow fiber membrane can achieve high permeability. Usage of the membrane having the above characteristics makes it possible to reduce a membrane area to be used as well as to lower an operating pressure of the membrane. In addition, such a membrane enables to prolong a membrane usage period (membrane life) and to reduce cleaning frequency with chemicals. Further, such a membrane enables to reduce water production cost.

According to the second aspect of the present invention, upon dissolution of a vinylidene fluoride resin in a solvent to prepare a spinning liquid, inorganic particles and an aggregater are added for improving the aggregation of the inorganic particles in the spinning liquid so as to make it possible to give a specific porous structure to a hollow fiber membrane. Further, since inner surface of the hollow fiber is formed using an internal coagulating liquid containing a hydrophilic resin, preferably using an internal coagulating liquid having a specific relationship with the spinning liquid in terms of three dimensional solubility parameter as described below, the inner surface of the hollow fiber membrane is slowly coagulated so as to form larger pores on the inner surface of the hollow fibers than those on the outer surface of the hollow fibers. Accordingly, the hydrophilic resin in the internal coagulating liquid can enter from the inner surface of the hollow fiber, through inside of the hollow fiber wall, to reach to outer surface of the hollow fiber so as to produce a vinylidene fluoride resin porous hollow fiber membrane that contains a hydrophilic resin in a specific manner.

BRIEF DESCRIPTION OF DRAWINGS

The present invention will be understood clearly based on the below described explanation of preferred embodiments with reference to the attached drawings. However, it should be noted that the embodiments and drawings are merely illustrative and explanatory examples, and are not limiting the scope of the invention. The scope of the invention is determined by the attached claims. In the attached drawings, same elements in different drawings are shown by the same symbols.

FIG. 4-1 is a scanning electron micrograph of the outer surface of the hollow fiber membrane of Example 1.

FIG. 4-2 is a scanning electron micrograph of the inner surface of the hollow fiber membrane of Example 1.

FIG. 4-3 is a scanning electron micrograph of the cross-section of the hollow fiber membrane of Example 1.

FIG. 5-1 is a scanning electron micrograph of the outer surface of the hollow fiber membrane of Example 5.

FIG. 5-2 is a scanning electron micrograph of the inner surface of the hollow fiber membrane of Example 5.

FIG. 5-3 is a scanning electron micrograph of the cross-section of the hollow fiber membrane of Example 5.

FIG. 6-1 is a scanning electron micrograph of the outer surface of the hollow fiber membrane of Comparative Example 3.

FIG. 6-2 is a scanning electron micrograph of the inner surface of the hollow fiber membrane of Comparative Example 3.

FIG. 6-3 is a scanning electron micrograph of the cross-section of the hollow fiber membrane of Comparative Example 3.

Figure 7:
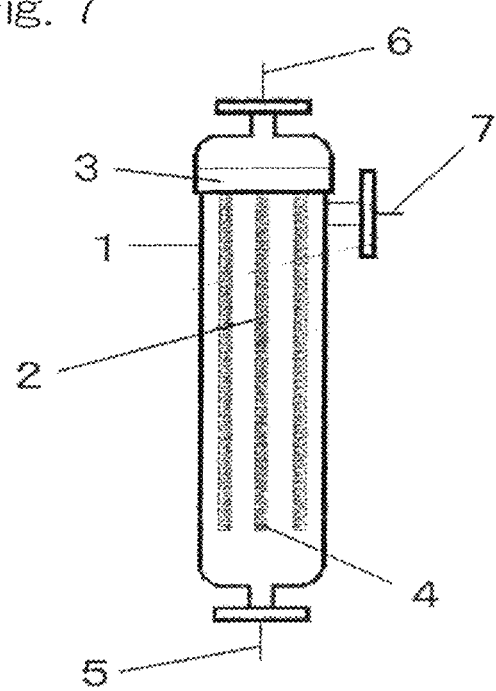
FIG. 7 is a sectional view showing one embodiment of a membrane filtering device that incorporate modules of the hollow fiber membrane according to one embodiment of the present invention.

Explanation of numerals in FIG. 7 is as follows:

1: Membrane filtering device
2: Membrane module
3: Upper end portion
4: Lower end portion
5: Inlet
6: Port for introduce air
7: Air vent.

DESCRIPTION OF EMBODIMENTS

Porous Hollow Fiber Membrane

According to the present invention, the term "porous hollow fiber membrane" denotes a porous membrane having a hollow fiber shape, and the term "porous membrane" denotes a membrane having a plurality of pores on both sides of the hollow fiber membrane. The porous membrane may have pores in shape of mainly circular or oval, in part, various shapes such as a pillar, a polygonal, and a shape of these combinations. The plurality of pores are formed upon formation of membrane structure from a matrix polymer. The membrane can advantageously trap particles in a fluid while allowing the fluid to flow through the membrane due to the specific porous membrane structure.

Content of Hydrophilic Resin

The vinylidene fluoride resin porous hollow fiber membrane according to the present invention needs to contain a hydrophilic resin in a concentration of 0.5 to 10% by weight, and may preferably contain a hydrophilic resin at a concentration of 1.5 to 10% by weight, and more preferably 2.5 to 9.0% by weight.

As the hydrophilic resins, there may be used a resin such as a polyvinyl pyrrolidone, a cellulose ester, an ethylene-vinyl alcohol, and a polyvinyl alcohol, where polyvinyl alcohol resins are preferable in terms of easy handleability.

The method for incorporating the hydrophilic resin into the vinylidene fluoride resin porous hollow fiber membrane is not particularly to limited to a specific one. As described later, there is described a method bringing a hollow fibrous material extruded from the spinning nozzle (spinneret) into contact with an internal coagulating liquid containing a hydrophilic resin. According to the method, the hollow fiber membrane can contain the hydrophilic resin by transferring the hydrophilic resin from the internal coagulating liquid to the hollow fibrous material so that the major portion of the hydrophilic resin can reside on the surfaces of the hollow fiber membrane as well as on the pore surfaces in the membrane.

Where the content of the hydrophilic resin is much less than 0.5% by weight, the membrane does not have sufficient hydrophilicity to achieve the above-mentioned effect. In contrast, where the content of the hydrophilic resin is more than 10% by weight, the excess amount of hydrophilic resin hinders water flow so as to reduce water permeability of the membrane.

Inner and Outer Diameters of Porous Hollow Fiber Membrane

According to the present invention, the vinylidene fluoride resin porous hollow fiber membrane preferably has an inner diameter of 0.4 to 3.0 mm.

Where the inner diameter of the hollow fiber membrane is too small, the membrane may have high resistance (in-tube pressure loss) to a permeate, resulting in poor flow. Where the inner diameter is too large, the porous hollow fiber membrane may easily cause deformation such as collapse and distortion.

According to the present invention, the vinylidene fluoride resin porous hollow fiber membrane preferably has an outer diameter in a range from 0.5 to 7 mm.

Average Pore Size

The porous hollow fiber membrane according to the present invention is characterized that the average pore size on inner surface of the porous hollow fiber membrane is larger than the average pore size on outer surface of the porous hollow fiber membrane. Upon feeding a liquid to be treated (e.g., raw water) to the outer surface of the porous hollow fiber membrane, the outer surface layer of the membrane can trap particles to be removed in the liquid while maintaining permeability of the liquid because the average pore size comes to be larger towards the inner surface.

As for the average inner and outer pore sizes of the porous hollow fiber membrane, the average pore size on inner surface (Pi) (μm) and the average pore size on outer surface (Po) (μm) are preferably in ranges satisfying the following formulae, respectively:

$$0.02 \leq Pi \leq 200.0 \tag{1}$$

$$0.01 \leq Po \leq 10.0 \tag{2}$$

More preferably, the Pi and Po are in ranges satisfying the following formulae, respectively:

$$0.1 \leq Pi \leq 100.0 \tag{3}$$

$$0.01 \leq Po \leq 9.0 \tag{4}$$

Further, preferably, the Pi and Po are in ranges satisfying the following formulae, respectively:

$$0.3 \leq Pi \leq 20.0 \tag{5}$$

$$0.01 \leq Po \leq 5.0 \tag{6}$$

The membrane having too small pore size on outer surface may capture fine particles but deteriorate in permeability. The membrane having too large pore size on outer surface may have a lower strength.

Ratio of Inner Average Pore Size to Outer Average Pore Size

The membrane preferably has average inner and outer pore sizes, i.e., average pore sizes on inner and outer surfaces, in the above-described range. The ratio Pi/Po of the average inner pore size Pi to the average outer pore size Po is preferably in a range shown in the following formula (7):

$$2.5 \leq Pi/Po \leq 50.0 \tag{7}$$

More preferably, the ratio Pi/Po is in a range shown in the following formula:

$$3.0 \leq Pi/Po \leq 50.0 \tag{8}$$

Further preferably, the ratio Pi/Po is in a range shown in the following formula:

$$3.5 \leq Pi/Po \leq 50.0 \qquad (9)$$

The membrane having a ratio Pi/Po of lower than 2.5 has insufficient permeability of the liquid to be treated. In contrast, the membrane having a ratio Pi/Po of greater than 50.0 has too large inner pore size to maintain membrane strength. Accordingly, there is a possibility to obtain a hollow fiber membrane that is not suitable for water treatment. The porous hollow fiber membranes having a ratio Pi/Po within the above-described range have balanced performances such as permeability, fractionation property, and strength in many applications.

The porous hollow fiber membrane according to the present invention preferably has a three dimensional network structure containing circular or oval pores in cross-sectional direction, or may have a fingered structure or voids. Also, the porosity that is a volume ratio showing the void space (empty space) within the porous membrane is preferably from 50 to 90%, and more preferably 60 to 90%. Where the porosity of the membrane is too small, it is difficult to achieve a sufficiently fast rate for pure water permeation. In contrast, where the porosity of the membrane is too large, the membrane has lowered strength so that the membrane lacks durability because of membrane rupture or bent during filtration implementation.

Surface Pore Ratios of Outer and Inner Surfaces

The outer surface of the porous hollow fiber membrane according to the present invention preferably has a surface pore ratio (ratio of surface opening area relative to total area) of outer surface of 5% or higher and 40% or lower, more preferably from 7 to 35%, and further preferably from 10 to 35%. The porous hollow fiber membrane having a too low surface pore ratio may deteriorate in efficiency of liquid processing. In contrast, the porous hollow fiber membrane having a too high surface pore ratio may tend to have insufficient membrane strength.

The inner surface of the porous hollow fiber membrane according to the present invention preferably has a surface pore ratio of inner surface of 10% or more and 60% or less, more preferably from 15 to 50%, and further preferably from 20 to 50%. The porous hollow fiber membrane having a too low surface pore ratio may deteriorate in efficiency of liquid processing. In contrast, the porous hollow fiber membrane having a too high surface pore ratio may tend to have insufficient membrane strength.

Fraction Particle Size

The porous hollow fiber membrane according to the present invention preferably has a fraction particle size of 0.01 μm or greater and 5 μm or smaller, more preferably 0.01 μm or greater and 4.5 μm or smaller, and further preferably 0.01 μm or greater and 4.0 μm or smaller.

The porous hollow fiber membrane having a fraction particle size of smaller than 0.01 μm enables to remove fine particles, but because of the significant permeation resistance, such a membrane may have a possibility that significant reduction in permeability occur. On the contrary, the porous hollow fiber membrane having a fraction particle size of greater than 5 μm is difficult to produce. Upon producing such a porous hollow fiber membrane, as described later, the production process of the membrane needs spinning from a spinning liquid containing large-sized particles that are subsequently to be dissolved for elimination after spinning procedure. However, since these large-sized particles cause trouble over uniform dispersion in the polymer liquid, the obtained porous hollow fiber membrane easily has non-uniform structure with large voids so that the membrane may cause deterioration in strength.

Pure Water Permeability

The porous hollow fiber membrane according to the present invention contains a hydrophilic resin, preferably a hydrophilic polyvinyl alcohol resin. Accordingly, even in a dry state, the hollow fiber membrane has a pure water permeation rate under 98 kPa at 25° C. satisfying the following formula:

$$(FLUX_d/FLUX_w) \times 100 \geq 40.0$$

Wherein $FLUX_d$ represents a pure water permeation rate (L/m²/hr/98 kPa) of the hollow fiber membrane in a dry state, $FLUX_w$ represents a pure water permeation rate (L/m²/hr/98 kPa) of the hollow fiber membrane in a wet state.

It should be noted that the hollow fiber membrane in a dry state denotes a dried hollow fiber membrane that is allowed to stand in a constant temperature dryer with blower at 60° C. for 24 hours or longer so that the water condition in the hollow fiber membrane reached into sufficient equilibrium with 60° C. air in the drier; and that the hollow fiber membrane in a wet state denotes a wet hollow fiber membrane that is immersed in 50% ethanol for 20 minutes followed by washing with running water for 20 minutes.

Further, since the porous hollow fiber membrane according to the present invention contains a hydrophilic resin, preferably a hydrophilic polyvinyl alcohol resin, even if the porous hollow fiber membrane is a dried hollow fiber membrane subjected to repeated exposures of both wet and dry conditions, the dried hollow fiber membrane has a pure water permeation rate under 98 kPa at 25° C. satisfying the following formula:

$$(FLUX_{d10}/FLUX_w) \times 100 \geq 10.0 \qquad (10)$$

More preferably, the pure water permeation rate satisfies the following formula:

$$(FLUX_{d10}/FLUX_w) \times 100 \geq 80.0 \qquad (11)$$

Wherein $FLUX_{d10}$ denotes a pure water permeation rate (L/m²/hr/98 kPa) of the hollow fiber membrane in a dry state after 10 times alternative wet and dry exposures, each exposure being conducted under wet condition and to subsequent dry condition; $FLUX_w$ denotes a pure water permeation rate (L/m²/hr/98 kPa) of the hollow fiber membrane in a wet state.

It should be noted that the phrase "10 times alternative wet and dry exposures, each exposure being conducted under wet condition and subsequent dry condition" specifically means 10 times alternative wet and dry exposures each exposure operation consisting of rendering a hollow fiber membrane to be wet followed by rendering the wet hollow fiber membrane to be dried, for example, a first exposure consisting preparing a wet hollow fiber membrane and drying the wet hollow fiber membrane, a second exposure consisting of wetting the dried hollow fiber membrane and drying the wet hollow fiber membrane, and until tenth exposure, the procedures are repeated for ten times.

Conventional hollow fiber membranes cannot maintain pure water permeation rate, i.e., these membranes have significantly reduced pure water permeation rate once dried. Accordingly, these conventional hollow fiber membranes require moisturizing treatment as well as protective treatment before they come to be in a dry state. On the contrary, the porous hollow fiber membranes according to the present invention can omit such treatments so as to be advantageously used in terms of process controllability and cost reduction.

Vinylidene Fluoride Resin

According to the present invention, as the vinylidene fluoride resin constituting the polyvinylidene fluoride porous hollow fiber membrane, there may be mentioned a resin containing a vinylidene fluoride homopolymer and/or a vinylidene fluoride copolymer, and also a resin containing a plurality of vinylidene fluoride copolymer species. Examples of the vinylidene fluoride copolymer may include a copolymer of vinylidene fluoride with at least one comonomer selected from the group consisting of vinyl fluoride, tetrafluoroethylene, hexafluoropropylene, and trifluorochloroethylene. The weight average molecular weight of the vinylidene fluoride resin may be appropriately selected depending on membrane strength and water permeability to be required. Where the weight average molecular weight of the vinylidene fluoride resin is too large, the membrane constituting such vinylidene fluoride resin may be difficult to produce. Where the weight average molecular weight of the vinylidene fluoride resin is too small, the membrane comprising such vinylidene fluoride resin may have reduced strength. Therefore, the vinylidene fluoride resin preferably has a weight-average molecular weight of 50,000 or greater and 1,000,000 or less. In the case where the porous membrane is used in water treatment in which the porous membrane is exposed to chemical cleaning, the weight average molecular weight is preferably 100,000 or greater and 900,000 or less, and further preferably 150,000 or greater and 800,000 or less.

Polyvinyl Alcohol Resin

According to the present invention, as a hydrophilic resin contained in the vinylidene fluoride resin porous hollow fiber membrane, there may be mentioned preferably a polyvinyl alcohol resin. Examples of the polyvinyl alcohol resin may include a polyvinyl alcohol; a copolymer of vinyl alcohol and a vinyl compound such as vinyl acetate, styrene, and itaconic acid; or a graft polymer in which a vinyl compound as exemplified above is grafted onto a polyvinyl alcohol; and other polyvinyl alcohol-based polymers. Where a polyvinyl alcohol resin having a charged group is used for producing a membrane, it is also possible to impart ion-exchange ability and/or ion-selective permeability in addition to hydrophilicity. The polyvinyl alcohol resin preferably has a viscosity-average molecular weight of 10,000 or more. The polyvinyl alcohol resin can be introduced into a porous hollow fiber membrane by using an internal coagulating liquid containing the polyvinyl alcohol resin in the process of forming the porous hollow fiber membrane. Where the viscosity average molecular weight is less than 10,000, the polyvinyl alcohol resin adhered on the surface of the hollow fiber membrane may be easily extracted by hot water treatment or the like for removing the polyvinyl alcohol resin, so as to have a possibility of difficult increase in residual amount of the polyvinyl alcohol resin in the membrane. In contrast, the polyvinyl alcohol resin having a viscosity-average molecular weight of 100,000 or more can persist in the membrane due to slower diffusion rate, but the coagulation liquid containing such a polyvinyl alcohol resin may have an increased viscosity resulting in difficulty in membrane production. Further, thus obtained membranes sometimes require a long period of time for hot water treatment.

The polyvinyl alcohol resin has preferably a saponification degree of 60 mol % or more and 95 mol % or less, more preferably 70 mol % or more and 90 mol % or less. The polyvinyl alcohol resin having a saponification degree in the above range can have an increased solubility so as to improve handleability.

Production of Porous Hollow Fiber Membrane

Hereinafter an example of a producing method of a porous hollow fiber membrane according to the present invention will be described. The production process includes bringing a spinning liquid containing a mixture of a vinylidene fluoride resin, a solvent, inorganic particles, and an aggregater into contact with an internal coagulating liquid containing a hydrophilic resin at a concentration of 0.1 to 15% by weight. More specifically, the spinning liquid to be used can be obtained by fusing and kneading a mixture of a vinylidene fluoride resin, a water-soluble solvent, an aggregater, and inorganic particles at a temperature of lower than 200° C. The internal coagulating liquid to be used can be a solution containing a solvent satisfying a condition described later and a hydrophilic resin at a concentration of 0.1 to 15% by weight. The spinning liquid extruding from a spinneret at 100° C. or higher forms a hollow fibrous material that subsequently enters a dry spinning zone between the spinneret and an external coagulation bath. Thereafter the hollow fibrous material is introduced into an external coagulation bath containing an aqueous salt solution having a temperature of 50° C. or higher to be solidified. The solidified hollow fibrous material may be subjected to drawing and shrinking to obtain a hollow fiber membrane.

Spinning Liquid

In the process of the porous hollow fiber membrane according to the present invention, into a vinylidene fluoride resin are added a solvent, inorganic particles and an aggregater for enhancing aggregation of the inorganic particles to prepare a spinning liquid. The solvent is added for dissolving the resin; the inorganic particles and the aggregater are added for forming a porous structure. The porous structure can be formed during the process of coagulating the spinning liquid to form a hollow fiber membrane by removing the inorganic particles and the aggregater from the spun hollow fiber membrane.

Solvent

As the solvent for dissolving the vinylidene fluoride resin in order to prepare the spinning liquid, there may be mentioned preferably a water-soluble solvent such as γ-butyrolactone, ε-caprolactone, dimethylformamide, dimethylsulfoxide, and dimethylacetamide. The water-soluble solvent can be advantageously used because extraction of the solvent can be carried out with water from the porous membrane after membrane formation. Further, the extracted solvent is disposable by carrying out bio-treatment or other treatment. The porous hollow fiber membrane according to the present invention is preferably produced using γ-butyrolactone, among the above solvents, in view of environmental load, safety, and cost reduction.

Inorganic Particles

The inorganic particles to be added to the spinning liquid can be used as nuclei (central portions) for forming pores in the porous hollow fiber membrane. The inorganic particles are preferably fine particles having relatively narrow size distribution and easy to remove with chemicals or others. Examples of the inorganic particles may include silica, calcium silicate, aluminum silicate, magnesium silicate, calcium carbonate, magnesium carbonate, calcium phosphate, oxides or hydroxides of a metal such as iron and zinc, and salts such as sodium salt, potassium salt, and calcium salt. In particular, the inorganic particles having aggregability can be added in such a formulation that would have caused a phase separation between the vinylidene fluoride resin and the solvent in ordinary circumstances. Since aggregable inorganic particles improve a stability of the solution containing a vinylidene fluoride resin and a solvent, a porous membrane having a larger pore size can be advantageously produced. In view of aggregability, inorganic particles may be preferably silica among the above particles. The silica may be any one of hydrophilic silica, hydrophobic silica, spherical silica, or amorphous silica. The inorganic particles may have a particle diameter (agglomerated particle size as for the aggregable particle) appropriately selected by a desired pore size of the porous membrane. Where the membrane is a microfiltration membrane having a fraction particle size of 0.01 μm to 1 μm, inorganic particles having an average particle diameter (an average agglomerated particle size for inorganic particle having aggregability) of 0.01 μm to 1 μm can be selected. Where the membrane is a microfiltration membrane having a fraction particle size of 1 μm or larger, inorganic particles having an average particle diameter (an average agglomerated particle size) of 1 μm or larger can be selected. It is also possible to mix the inorganic particles with different agglomerated particle size in order to control pore size of the porous membrane, particularly in order to improve the connectivity of the pores.

Aggregater

As the aggregater (aggregating agent) added to the spinning liquid for increasing aggregation of inorganic particles, there may be exemplified a polyhydric alcohol such as ethylene glycol, propylene glycol, triethylene glycol, tetraethylene glycol, a polyethylene glycol, and glycerine; a polyglycerol fatty acid ester such as decaglyceryl monolaurate; a polyoxyethylene glycerin fatty acid ester such as a polyoxyethylene glyceryl monostearate; a polyoxyethylene alkyl ether such as a polyoxyethylene lauryl ether and a polyoxyethylene cetyl ether; a polyoxyethylene polyoxypropylene alkyl ether such as a polyoxyethylene polyoxypropylene cetyl ether; a polyoxyethylene alkyl phenyl ether such as polyoxyethylene nonyl phenyl ether; a polyoxyethylene sorbitan fatty acid ester such as polyoxyethylene sorbitan monopalmitate; and others. Among them, preferable aggregaters include a polyethylene glycol and glycerine.

Preparation of Spinning Liquid

The above-described spinning liquid containing a vinylidene fluoride resin, a solvent, inorganic particles, and an aggregater may be, for example, a spinning liquid containing 20 to 40 parts by mass of vinylidene fluoride resin, 25 to 50 parts by mass of solvent, 10 to 30 parts by mass of inorganic particles, and 20 to 45 parts by mass of aggregater based on the total mass of the vinylidene fluoride resin, the solvent, the inorganic particles, and the aggregater being regarded as 100 parts by mass. The spinning liquid having a formulation outside the above range may cause trouble over stable spinning quality upon spinning porous hollow fiber membranes, and may have difficulty in obtaining the porous hollow fiber membrane having a uniform quality.

The above-mentioned spinning liquid containing a vinylidene fluoride resin, a solvent, inorganic particles, and an aggregater may include, if necessary, various additives such as an antioxidant, an ultraviolet absorber, a lubricant, an anti-blocking agent, and a dye in a range not impairing the purpose of present invention.

The mixture containing the above-mentioned vinylidene fluoride resin, the solvent, the inorganic particles, and the aggregater in a predetermined ratio is fused and kneaded typically using a biaxial kneading equipment, a blast mill, a mixer, or other mixing machines to obtain a spinning liquid. The kneading temperature is preferably in a range that a vinylidene fluoride resin and a solvent can be compatible while each component of the mixture does not decompose, usually 140° C. or higher and lower than 200° C., preferably 140° C. or higher and 190° C. or lower. The kneading temperature over 200° C. may not be desirable because of too much heating dynamics. In addition, the kneading temperature of lower than 140° C. may not be preferable because the vinylidene fluoride resin may be poor in solubility.

After kneading the spinning liquid, foams or bubbles are fully removed from the kneaded mixture, followed by metering using a metering pump such as a gear pump so as to be extruded from a spinneret having a co-axial structure to form a desired hollow fiber shape. Alternatively, a vinylidene fluoride resin and a solvent may be kneaded and extruded using an appropriate equipment to obtain pellets, subsequently these pellets may be fused in an extruder to be extruded from a spinneret having a co-axial structure.

Spinning Procedure

Into the spinning liquid extruded from the co-axial spinneret, an internal coagulating liquid is injected from the center of the co-axial spinneret. The extruded spinning liquid is subjected to travel at a predetermined distance in a gas. Thereafter, the travelling spinning liquid is immersed in an external coagulation bath so as to form a hollow fiber membrane shape.

Three Dimensional Solubility Parameter

According to the present invention, the three dimensional solubility parameter $(MPa)^{1/2}$ of a mixture consisting of a solvent and an aggregater in the spinning liquid and the three dimensional solubility parameter $(MPa)^{1/2}$ of the internal coagulating liquid may satisfy the following formulae:

$$21 \leq \delta(s,c) \leq 33 \tag{12}$$

$$23 \leq \delta(i,c) \leq 35 \tag{13}$$

Wherein $\delta(s, c)$ represents three dimensional solubility parameter of a mixture of a solvent and an aggregater in the spinning liquid, and $\delta(i, c)$ represents three dimensional solubility parameter of the internal coagulating liquid. Preferably, the solvent, the aggregater, and the internal coagulating liquid may be selected to satisfying the above formulae, and the components in the internal coagulating liquid are mixed. The three dimensional solubility parameter $(MPa)^{1/2}$ of the mixture of a solvent and an aggregater in the spinning liquid and the three dimensional solubility parameter $(MPa)^{1/2}$ of the internal coagulating liquid may satisfy more preferably the following formulae:

$$22 \leq \delta(s,c) \leq 33 \tag{14}$$

$$23 \leq \delta(i,c) \leq 34 \tag{15}$$

and further preferably the following formulae:

$$22 \leq \delta(s,c) \leq 32 \tag{16}$$

$$23 \leq \delta(i,c) \leq 33 \tag{17}$$

Where the above formulae (12) and (13) are satisfied, the inner surface of the hollow fiber membrane is formed at a slower rate so as to achieve a membrane structure having large pores on the inner surface. In the above formulae, where $\delta(s, c)$ is too small, the progress of the phase separation in the hollow fibrous material may be too slow to form pores on the surface, resulting in reduction of permeability. Where $\delta(s, c)$ is too large, the progress of the phase separation hollow fiber may be rapidly accelerated so as to form pores having too large pore sizes, resulting in deterioration in fraction particle size and strength. Where $\delta(i, c)$ is too small, coagulation of the spinning liquid comes to be too slow so as to generate coarse large pores (macro voids), resulting in failure in successful membrane formation.

Where δ(i, c) is too large, coagulation of the spinning liquid comes to be too slow so as to fail to form pores, resulting in permeability reduction.

Here, the term "three dimensional solubility parameter" (hereinafter sometimes referred to as "SP value".) is a value obtained by a method described in Polymer Handbook Fourth Edition Volume 2 (J. BRANDRUP, E. H. IMMERGUT, and E. A. GRULKE, "Polymer Handbook Fourth Edition Volume 2" A John Wiley & Sons, Inc., 1999. pp. 675-714).

In the present invention, the value can be determined by the following formulae:

$$\delta [MPa^{1/2}] = (\Delta E/V)^{1/2} \quad (18)$$

$$\Delta E = \Delta E_d + \Delta E_p + \Delta E_h \quad (19)$$

$$\delta^2 = \delta_d^2 + \delta_p^2 + \delta_h^2 \quad (20)$$

Here, $\delta$ denotes SP value $(MPa)^{1/2}$, $\Delta E$ denotes molecular cohesive energy (J/mol), V denotes molecular weight (cm$^3$/mol), $\Delta E_d$ denotes intermolecular force (J/mol), $\Delta E_p$ denotes dipole force (J/mol), $\Delta E_h$ denotes hydrogen bonding force (J/mol), $\delta_d$ denotes dispersion force section of the SP value (ml/mol), $\delta_p$ denotes dipole force section of the SP value (ml/mol), and $\delta_h$ denotes hydrogen bonding force of the SP value (ml/mol).

Although the SP value in the present invention can be generally obtained in accordance with a parameter of Hansen, it is possible to use parameters of Hoy for some values that are not described in Hansen. As for the SP values that are described neither in Hansen nor in Hoy, it is possible to estimate the SP values in accordance with a parameter equation of Hansen (see Allan F. M. Barton, "CRC Handbook of solubility parameters and other cohesion parameters" CRC Press, Inc. 1991. pp. 95-111).

It should be noted that, as for a mixture of a solvent and an aggregater, the SP value δ(s, c) can be determined from the following formula:

$$\delta_{(s,c)} = \delta_s \times \left( \begin{array}{c} \text{Weight Fraction} \\ \text{of Solvent} \end{array} \right) + \delta_l \times \left( \begin{array}{c} \text{Weight Fraction} \\ \text{of flocculant} \end{array} \right) \quad (21)$$

from an SP value of the solvent ($\delta$s) and a weight fraction thereof and an SP value of the aggregater ($\delta_l$) and a weight fraction thereof. The SP value of the internal coagulating liquid δ(i, c) can be also obtained in the same way.

According to the present invention, the solvent and the aggregater in the spinning liquid as well as the internal coagulating liquid can be selected to satisfy the above formula. As a preferable combination of solvent and aggregater/internal coagulating liquid, there may be exemplified a combination of solvent, aggregater/internal coagulating liquid as follows: γ-butyrolactone, polyethylene glycol/dimethylacetamide and glycerin, γ-butyrolactone, polyethylene glycol/dimethylformamide and glycerin, γ-butyrolactone, tetraethylene glycol/dimethylacetamide and glycerin γ-butyrolactone, glycerin/dimethylacetamide and glycerin γ-butyrolactone, glycerin/dimethylacetamide and glycerin, dimethylacetamide, polyethylene glycol/dimethylacetamide and glycerin, dimethylacetamide, ethylene glycol/dimethylacetamide and water, dimethylacetamide, ethylene glycol/dimethylacetamide and water, dimethylacetamide, polyethylene glycol/dimethylformamide and ethylene glycol, dimethylformamide, polyethylene glycol/dimethylformamide and water, dimethylformamide, diethylene glycol/dimethylformamide and water, dimethylformamide, triethylene glycol/dimethylformamide and water, dimethylformamide, polyethylene glycol/γ-butyrolactone and water, and others. Among them, the combination of γ-butyrolactone, polyethylene glycol/dimethylacetamide and glycerin; γ-butyrolactone, polyethylene glycol/dimethylformamide and glycerin; γ-butyrolactone, glycerin/dimethylacetamide and glycerin; and γ-butyrolactone, ethylene glycol/dimethylacetamide and glycerin are preferred. Table 1 shows values of the three dimensional solubility parameters of the above water-soluble solvents, aggregaters and internal coagulating liquids.

TABLE 1

| | | Solubility Parameter, SP value $(MPa)^{1/2}$ | | | |
|---|---|---|---|---|---|
| | | $\delta_d$ | $\delta_p$ | $\delta_h$ | $\delta$ |
| γ-Butyrolactone | GBL | 19.0 | 16.6 | 7.2 | 26.2 |
| Dimethylacetamide | DMAC | 16.8 | 11.5 | 10.2 | 22.7 |
| Dimethylformamide | DMF | 17.4 | 13.7 | 11.3 | 24.8 |
| Glycerin | Gly | 17.4 | 12.1 | 29.3 | 36.2 |
| Ethylene glycol | EG | 17.0 | 11.0 | 26.0 | 32.9 |
| Diethylene glycol | DEG | 16.2 | 14.7 | 20.5 | 29.9 |
| Triethylene glycol | Tri-EG | 16.0 | 12.5 | 18.6 | 27.4 |
| Polyethylene glycol | PEG200 | 16.7 | 5.6 | 16.7 | 24.3 |
| Polyethylene glycol | PEG600 | 16.6 | 3.2 | 12.1 | 20.8 |
| Water | | 15.5 | 16.0 | 42.3 | 47.8 |

Internal Coagulating Liquid

In order to produce a porous hollow fiber membrane according to the present invention, it is preferable to use a solution containing the hydrophilic resin at a concentration of 0.1 to 15% by weight as the internal coagulating liquid that is injected into the central portion of a co-axial spinneret so as to obtain a hollow fiber membrane containing a hydrophilic resin from 0.5 to 10% by weight.

Since the vinylidene fluoride porous hollow fiber membrane according to the present invention has a pore-size graded structure in which the average pore size on outer surface is smaller than that on the inner surface in the hollow fibers. Accordingly, it is preferable to allow a hydrophilic resin to be transferred from the inner surface having larger pores into the outer surface having smaller pores. In such a case, it is preferable to carry out spinning while using an internal coagulating liquid containing a hydrophilic resin.

In terms of being able to form preferable pore sizes, the temperature of the internal coagulating liquid may be adjusted to a temperature range of preferably from 80 to 170° C., and more preferably from 90 to 160° C.

Dry Spinning Zone Outside of Spinneret

The spinning liquid is extruded from the co-axial spinneret while the coagulating liquid is injected into the central portion of the spinneret. The extruded liquid is preferably subjected to travel at a predetermined distance (typically, 5 mm to 300 mm) in a gas (usually air), and then introduced into an external coagulating liquid so as to achieve stabilization of the hollow fiber shape. The traveling distance is preferably in a range of 5 mm to 300 mm. The extruded spinning liquid is cooled and solidified during the traveling time so as to form a hollow fibrous material, and then immersed in the external coagulating liquid to obtain a hollow fiber membrane. In this case, where the traveling distance is shorter than 5 mm, or longer than 300 mm, there is a tendency that the hollow fiber shape is unstable.

During the travel in a gas, if necessary, the surroundings of the traveling hollow fibrous material may be enclosed to prevent the air disturbance around the running fiber material, and/or to adjust air temperature and humidity.

External Coagulation Bath

The spinning liquid extruded from the spinneret may enter a dry spinning zone at a predetermined distance, and then may be immersed into an external coagulation bath to be cooled and solidified so as to form a porous hollow fiber membrane structure.

As for the external coagulating liquid constituting the external coagulation bath, it is preferable to use a non-solvent for the vinylidene fluoride resin, such as water and an aqueous salt solution. Examples of the salt solution may include solutions of various salts, such as sulfates, chlorides, nitrates, and acetates. Among them, sodium sulfate and potassium sulfate are preferably used. The concentration of the salt solution may be preferably 30 g/L or higher and in a range of 10 to 100% (more preferably 10 to 60%) relative to the saturated concentration of the aqueous solution. Where the salt solution has a concentration being either too high or too low, it may be difficult to obtain a preferable pore structure (e.g., surface pore ratio of outer surface and fraction particle size) of the porous hollow fiber membrane according to the present invention. Where the concentration is too low, coagulation occurs at a slower rate, resulting in larger surface pore ratio of outer surface as well as increased fraction particle size. Meanwhile, where the concentration is too high, the coagulation occurs at a faster rate, resulting in reduced surface pore ratio of outer surface, as well as smaller fraction particle size.

In addition, the temperature of the external coagulation bath may be 50° C. or higher, preferably 60° C. or higher, and it is appropriately selected within a range of 100° C. or lower. Where the temperature of the coagulation bath is either too low or too high, it may be difficult to obtain a preferable pore structure in the porous hollow fiber membrane according to the present invention.

According to the present invention, inside of the hollow fibrous material is brought into contact with an internal coagulating liquid injected into the extruded hollow fibrous material wherein the internal coagulating liquid has a specific three dimensional solubility parameter as described above and lower coagulating property than that of the external coagulating liquid; outside of the hollow fibrous material is brought into contact with an external coagulation bath after traveling in a gas at a predetermined distance, and the hollow fibrous material immersed in the external coagulation bath is cooled and solidified. Thus, it is possible to form a hollow fiber membrane having larger pores on the inner surface and smaller pores on the outer surface. In this case, one or more conditions such as gap-travelling distance, ambient temperature, and composition and temperature of external coagulating liquid can be appropriately selected because the condition(s) may affect controllability of hollow fiber membrane pore size and strength properties of the hollow fiber membrane.

Drawing

The coagulated hollow fiber membrane may be preferably drawn (stretched) at a certain drawing ratio. Drawing of the hollow fiber membrane can allow independent pores present in the cross-sectional direction of the membrane to be cleaved to transform into connecting pores so as to increase cross-sectional communicating property of the membrane. It is more preferable to perform drawing operation before extraction of the solvent, the inorganic particles, and the aggregater to form the porous structure. Drawing operation of the hollow fiber membrane containing a solvent, inorganic particles, and an aggregater can generate reduced breakage during drawing, and can achieve increased cross-sectional communicating property of the membrane due to presence of inorganic particles that can be starting point of cleavage of independent pores, in comparison with the hollow fiber membrane without a solvent, inorganic particles and an aggregater. Accordingly, drawing operation is advantageously carried out to achieve high permeability of the resulting hollow fiber membrane.

Hot-Water Treatment

During the coagulation procedure, the hydrophilic resin added to the internal coagulating liquid transfers from the inner surface to the outer surface in the hollow fiber membrane. In order for the hydrophilic resin to be approximately uniformly distributed in the hollow fiber membrane from the inner surface to the outer surface, it is preferable to carry out hot-water treatment by immersing thus-obtained porous hollow fiber membrane in a water bath at a temperature of 80° C. or higher. The hydrophilic resin can be eluted and diffused into the outer surface of the hollow fiber membrane due to the hydrophilic resin concentration difference between a hot-water bath and the internal coagulating liquid. As a result, the hydrophilic resin can be approximately uniformly dispersed on the membrane surface.

The elution ratio of the hydrophilic resin during the hot water treatment determined in accordance with the following formula:

$$\begin{pmatrix} \text{Elution Ratio \%} \\ \text{of Hydrophilic} \\ \text{Resin in Hot} \\ \text{Water Treatment} \end{pmatrix} = \begin{pmatrix} \text{Mass (mg) of} \\ \text{Hydrophilic Resin} \\ \text{Eluted in} \\ \text{Hot Water} \\ \text{Treatment} \end{pmatrix} \div \begin{pmatrix} \text{Mass (mg) of} \\ \text{Hydrophilic Resin} \\ \text{Added in Internal} \\ \text{Coagulating} \\ \text{Liquid} \end{pmatrix} \times 100$$

is preferably 10% or more to 90% or less, more preferably 40% or more and 90% or less, and further preferably 50% or more and 80% or less. Where the elution ratio is too high, it may be difficult to incorporate a predetermined amount of the hydrophilic resin into the hollow fiber membrane. Where the elution ratio is too low, excess amount of the hydrophilic resin may adhere to the hollow fiber membrane, in particular the inner surface of the hollow fiber membrane, resulting in reduction in permeability.

According to the hot water treatment, the hydrophilic resin can be approximately uniformly diffused from the inner surface to the outer surface in the hollow fiber membrane. The obtained hollow fiber membrane can maintain good water permeability even in a dry state, and also is sufficiently usable even after repeated exposure in alternative dry and wet states.

Distribution of Diffused Hydrophilic Resin

The uniform distribution of the hydrophilic resin distributed in the entire membrane can be confirmed by any measurement method that is not especially limited, for example, surface spectrophotometric analysis such as IR analysis and XPS analysis on membrane surface. Where the analysis is conducted at each of the outer surface, the inner surface, and the central portion of the hollow fiber membrane, it is possible to confirm that the hydrophilic resin resides on all of the outer surface, the inner surface, and the central portion of the hollow fiber membrane. As the preferable range of XPS, where the composition ratio of each element is calculated using the software (the details will be described later) for elemental composition analysis, ratio of peak area resulting from oxygen 1S (O1s) orbital may be preferably of 0.5% or more and 30% or less, more preferably 1% or more and 20% or less, and further preferably 1% or more and 15% or less. Where the range of XPS is within the above range, it may be regarded that the surface of the membrane is coated with the hydrophilic resin (e.g., a resin having an alcohol binding).

The surface XPS is applicable to a surface analysis at a depth from the surface of about 5 nm. The thinner the thickness of the hydrophilic resin coat is, the smaller the peak area ratio of the hydrophilic resin is.

It should be noted that according to the present invention the term "approximately uniform" means that the difference in peak area ratio between the outer surface and the inner surface, and is within a range of preferably ±10%, more preferably ±5%, and further preferably ±3% based on the peak area ratio of the central portion of the hollow fiber membrane.

Extraction

According to the present invention, the porous hollow fiber membrane can be obtained by extracting the solvent, the inorganic particles, and the aggregater contained in the hollow fiber membrane after drawing treatment. Extraction of these components can be carried out continuously (without winding) after spinning, coagulating solidification, and drawing procedures; alternatively carried out after winding the drawn hollow fiber membranes in a frame or reel or others; alternatively carried out after housing (packing) the hollow fiber membrane in a casing having a predetermined shape to be modularized. The extraction can be preferably carried out after drawing because the drawing can increase void areas on the surface as well as inside of the hollow fiber membrane so that the extraction solvent can advantageously penetrate into the internal portion of the hollow fiber membrane.

The solvent used for the extraction of the components described above needs to be a non-solvent for vinylidene fluoride resin at an extraction temperature. Where the inorganic particles are silica, the solvent for extracting the silica may be preferably an alkaline solution. Where the aggregater is poorly water-soluble, the solvent for extracting the aggregater may be hexane, acetone, methanol, or other solvent. Where the aggregater is water-soluble, the solvent for extracting the aggregater may be water. It is possible to carry out multi-stage extraction in which the extraction solvents are changed depending on the components to be extracted. The obtained porous hollow fiber membrane may be preferably dried after the extraction treatment.

Acetalization of Hydrophilic Resin

According to the present invention, if necessary, the hollow fiber membrane may be acetalized before extraction and after drawing so as to be insoluble in hot water. Acetalization of the hollow fiber membrane enables to prevent the membrane from excessive elution of the hydrophilic resin from the membrane at the time of both extraction procedure and practical use.

Acetalization can be carried out by treating the hollow fiber membrane in an aqueous acid solution containing an aldehyde compound. Examples of the aldehydes may include formaldehyde, glyoxal, glutaraldehyde, malondialdehyde, nonanedial, and other aldehydes. As the acid, it is preferable to use a strong acid such as sulfuric acid, hydrochloric acid, and nitric acid.

Porous Hollow Fiber Membrane Module

According to the present invention, a predetermined number of the porous hollow fiber membranes are bundled, and cut into a predetermined length, and placed into a housing having a predetermined shape. At least one of the end portions of the hollow fiber bundles is fixed (bonded) to the housing with a heat-curable resin such as a polyurethane resin so as to produce a module. It should be noted that various modular structures are known such as the structure in which bundles of hollow fibers are bonded at both ends, and the hollow fibers are unsealed or open at both ends; and the structure in which bundles of hollow fibers are bonded at one end and unbonded at the other end, and the hollow fibers are unsealed or open at the bonded end and sealed or closed at the unbonded end. The porous hollow fiber membrane according to the present invention can be used in any type of the module structures.

The modules including the porous hollow fiber membrane according to the present invention can be used for various applications such as water treatment, drinking water production, industrial water production, and wastewater treatment.

EXAMPLES

The present invention will be described in more detail below by means of examples, but the present invention is not limited to these examples in any manner.

Measurement of Average Pore Size

Surface of a sampled porous hollow fiber membrane was photographed using a scanning electron microscope ("S-3000N" produced by Hitachi, Ltd.). With respect to pores visible in the view field of the photograph, the inside diameter of each of the pores was measured until the number of measured pores becomes at least 100. The average of the measured inside pores diameter was calculated to be determined as average pore size.

Surface Pore Ratios of Inner and Outer Surfaces

Using a scanning electron microscope ("S-3000N" produced by Hitachi, Ltd.), inner surface and outer surface of a sampled porous hollow fiber membrane were photographed. Obtained images were analyzed using an image-measuring software ("Image-Pro Plus" produced by Puranetoron K.K.) to determine surface pore ratio of inner surface (surface opening ratio of inner surface of the hollow fiber membrane) and surface pore ratio of outer surface (surface opening ratio of outer surface of the hollow fiber membrane). It should be noted that where each of the surface pore ratios of inner and outer surfaces is less than 1.0%, the surface pore ratio is described as "<1.0%".

Fraction Particle Size After measuring the inhibition ratios of a sampled hollow fiber membrane with respect to at least two kinds of particles each having a particle diameter different from each other, an S value where R is 90 is calculated from the following formula (22) based on the measured inhibition ratios and the obtained S value was regarded as fraction particle size.

$$R = 100/(1 - m \times \exp(-a \times \log(S))) \quad (22)$$

In the above formula (22), a and m are constant values each determined depending on the species of porous hollow fiber membrane, and calculated on the basis of two or more measured inhibition ratios. It should be noted that where the inhibition ratio of particles (0.01 μm diameter) is 90% or more, the fraction particle size is described as "<0.01 μm".

Pure Water Permeation Rate

Using a sampled porous hollow fiber membrane module containing hollow fibers that are unsealed or open at one end and having an effective length of 3 cm, pure water used as raw water was filtrated by external pressurized filtration from outside of the membrane into inside of the membrane in the conditions of filtration pressure of 50 kPa and temperature of 25° C. to measure an amount of water permeation per hour. The pure water permeation rate was calculated by converting the measured permeation amount into a numerical value based on unit membrane area, unit time, and unit pressure. It should be noted that where the pure water permeation rate is faster than 0 and slower than 100 L/m²/hr/98 kPa, the pure water permeation rate is described as "<100 L/m²/hr/98 kPa".

Measurement of Hydrophilic Resin Content

The content of the hydrophilic resin in a sampled hollow fiber membrane was determined in the following manner: the vinylidene fluoride resin in the hollow fiber membrane was dissolved and removed; the undissolved residue was dried to measure the dry weight; and the content of the hydrophilic resin in the hollow fiber membrane was calculated.

Measurement of Hydrophilic Resin Distribution

Surface X-ray analysis of a sampled hollow fiber membrane was carried out using a scanning X-ray photoelectron spectrometer ("PHI Quantera SXM" produced by ULVAC-PHI, INCORPORATED.) at each of the outer surface, the inner surface and the central portion of the membrane under the conditions of X-ray excitation: 100 μm-25 W-15 kV and anticathode: Al. As for elemental composition analysis method, the composition ratio of each element was calculated using Multipak software (data processing software using MAT LAB software).

Example 1

A mixture was prepared by mixing 34 parts by weight of polyvinylidene fluoride (hereinafter, sometimes abbreviated as PVDF) ("SOLEF6010" produced by SOLVAY SPECIALTY POLYMERS JAPAN K.K.) as a vinylidene fluoride resin, 21 parts by weight of γ-butyrolactone ("GBL" produced by Mitsubishi Chemical Corporation,) as a solvent, 25 parts by weight of Silica ("Aerosil 50" manufactured by NIPPON AEROSIL CO., LTD.) as inorganic particles, and 20 parts by weight of polyethylene glycol ("PEG200" manufactured by Sanyo Chemical Industries, Ltd.) as an aggregater at a weight ratio of 34:21:25:20, where the SP value ($\delta(s, c)$) of the mixture of GBL and PEG200 was 25.3 $(MPa)^{1/2}$.

The above mixture was fed to a biaxial extruder to be kneaded under heating (temperature: 155° C.). The kneaded mixture was extruded as a spinning liquid from a co-axial spinneret having an outer diameter of 1.6 mm and an inner diameter of 0.8 mm, while simultaneously injecting an internal coagulating liquid that was a mixed solution having a temperature of 155° C. and containing 2 parts by weight of polyvinyl alcohol ("PVA-205" manufactured by Kuraray Co., Ltd., average polymerization degree: 500, saponification degree: 87 to 89 mol %), 58.8 parts by weight of dimethylacetamide ("DMAC" manufactured by Mitsubishi Gas Chemical Co., Ltd.), and 39.2 parts by weight of glycerin (purified glycerin manufactured by Kao Corporation), where the SP value ($\delta(i, c)$) of the mixture of DMAC and glycerin was 28.1 $(MPa)^{1/2}$. The spinning liquid extruded from the spinneret was subjected to traveling through a gap at a distance of 3 cm, followed by being immersed in an external coagulation bath having a temperature of 80° C. and containing a 20 wt % aqueous solution of sodium sulfate to be cooled and solidified. The solidified hollow fibrous material was subjected to drawing, and then subjected to hot water treatment to extract and remove the solvent (γ-butyrolactone), the aggregater (PEG200), the internal liquid (DMAC, glycerin), and the redundant polyvinyl alcohol. The removal ratio of extracted polyvinyl alcohol was 70%. Namely, by allowing 30% of the polyvinyl alcohol to be transferred into the hollow fibrous material, a hollow fiber membrane containing the polyvinyl alcohol could be obtained. Then, the polyvinyl alcohol was subjected to acetalization to render it insoluble. Subsequently, the hollow fiber membrane was immersed in an aqueous solution of sodium hydroxide to extract and remove the inorganic particles (silica), and the resulting hollow fiber membrane was dried. Thus obtained hollow fiber membrane had an outer diameter of 1.2 mm, an inner diameter of 0.6 mm, and a porosity of 65%. According to the surface XPS analysis, intensity occupancies of O1s orbits at the outer surface, the central portion, and the inner surface of the hollow fiber membrane were 6.3%, 6.7%, and 6.9%, respectively, so that approximately uniform distribution of the hydrophilic resin could be confirmed. Table 2 shows the test results. Further, the scanning electron micrographs photographed for film structure observation were also shown in FIGS. 4-1 to 4-3.

Figure 1:
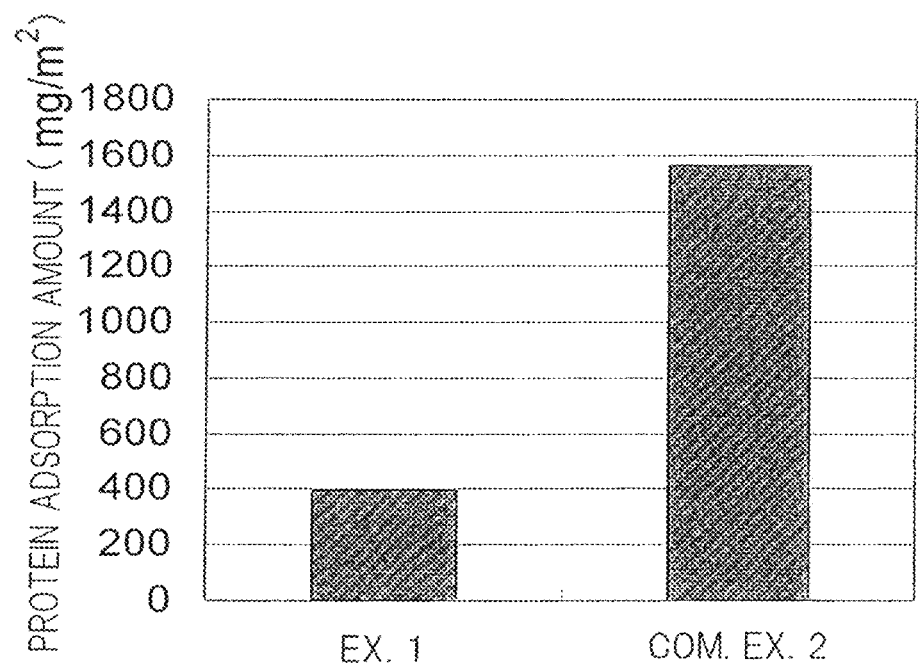
FIG. 1 is a graph showing a protein adsorption amount of the hollow fiber membranes of Example 1 and Comparative Example 2.

FIG. 1 shows the test results of protein adsorption to the hollow fiber membrane. This test was carried out in the following manner. After wet-treating a hollow fiber membrane (2 g in dry weight), the wet-treated membrane was immersed in phosphate buffered solution of a 1000 ppm bovine serum albumin ("A7906-10G" produced by Sigma-Aldrich) for 24 hours, and then the concentration of bovine serum albumin in the solution after 24 hour immersion was measured. The difference in bovine serum albumin concentration in the solution before and after membrane immersion was regarded as adsorption amount of initially adsorbed protein. The hollow fiber membrane that adsorbed bovine serum albumin was washed with another phosphate buffered solution for 24 hours to measure the concentration of the eluted bovine serum albumin. The concentration of the eluted bovine serum albumin was regarded as the adsorption amount of washable protein in order to calculate protein adsorption amount as follows.

$$\text{Adsorption Amount of Protein (mg/m}^2) = \text{Adsorption Amount of Initially Adsorbed Protein} - \text{Adsorption Amount of Washable Protein}$$

As shown in the test results, the obtained hollow fiber membrane achieved reduced protein adsorption amount of protein so as to be regarded as having high fouling resistance.

Figure 2:
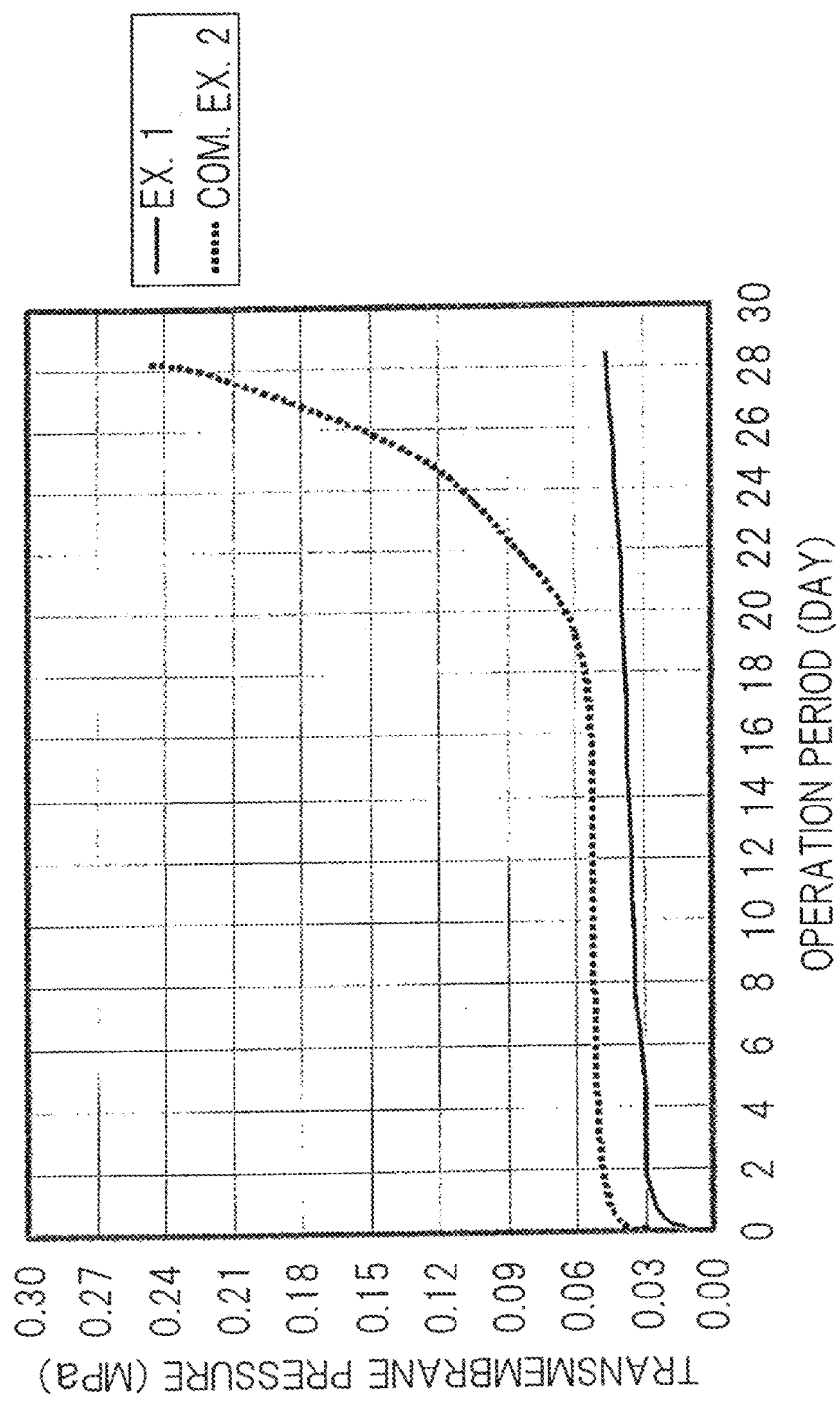
FIG. 2 is a graph showing the relationship between the operation period and transmembrane pressure in the filtering devices that incorporate the hollow fiber membrane modules of Example 1 and Comparative Example 2, respectively.

By using the above-obtained hollow fiber membranes, a membrane filtering device 1 as shown in FIG. 7 was produced. The filtering device 1 is configured to pack a membrane module 2 having an effective membrane length of 100 cm and containing 70 hollow fibers. The upper end portion 3 of the module is fixed with an epoxy resin. At the upper end portion 3, each of the hollow fibers is unsealed or open. At the lower end portion 4, each of the hollow fibers is sealed with an epoxy resin. Through an inlet 5 for feeding raw water as well as introducing air, river water having a turbidity of 1.0 NTU (measured at 2100Q produced by HACH Co.) was introduced from the outer surface side of the hollow fibers to be filtrated out from the inner surface side of the hollow fibers through a port 6 to obtain filtrated water. The port 6 was disposed at the upper end portion and used for collecting filtered water as well as introducing air. After the filtration was carried out for 30 minutes at a set flow rate represented by the formula:

$$\text{Set Flow rate} = \frac{\text{Filtration Flow Rate } (m^3/\text{day})}{\text{Outer Surface Area of Hollow Fiber Membrane } (m^2)}$$

of 2.0 m/day, compressed air was introduced from the port 6 for 10 seconds under an air pressure of 0.2 MPa. At the same time, compressed air was also introduced from the inlet 5 at the lower end portion of the module for carry out air scrubbing for 60 seconds under an air pressure of 0.1 MPa to wash sediments adhered to the membrane. It should be noted that drainage of the introduced air was secured by opening an air vent 7. The removed sediments were withdrawn from the inlet 5 so as to restart filtration. Continuous procedure of this cycle revealed that the module could be operated at a stable transmembrane pressure for at least 28 days. FIG. 2 shows the obtained results.

Figure 3:
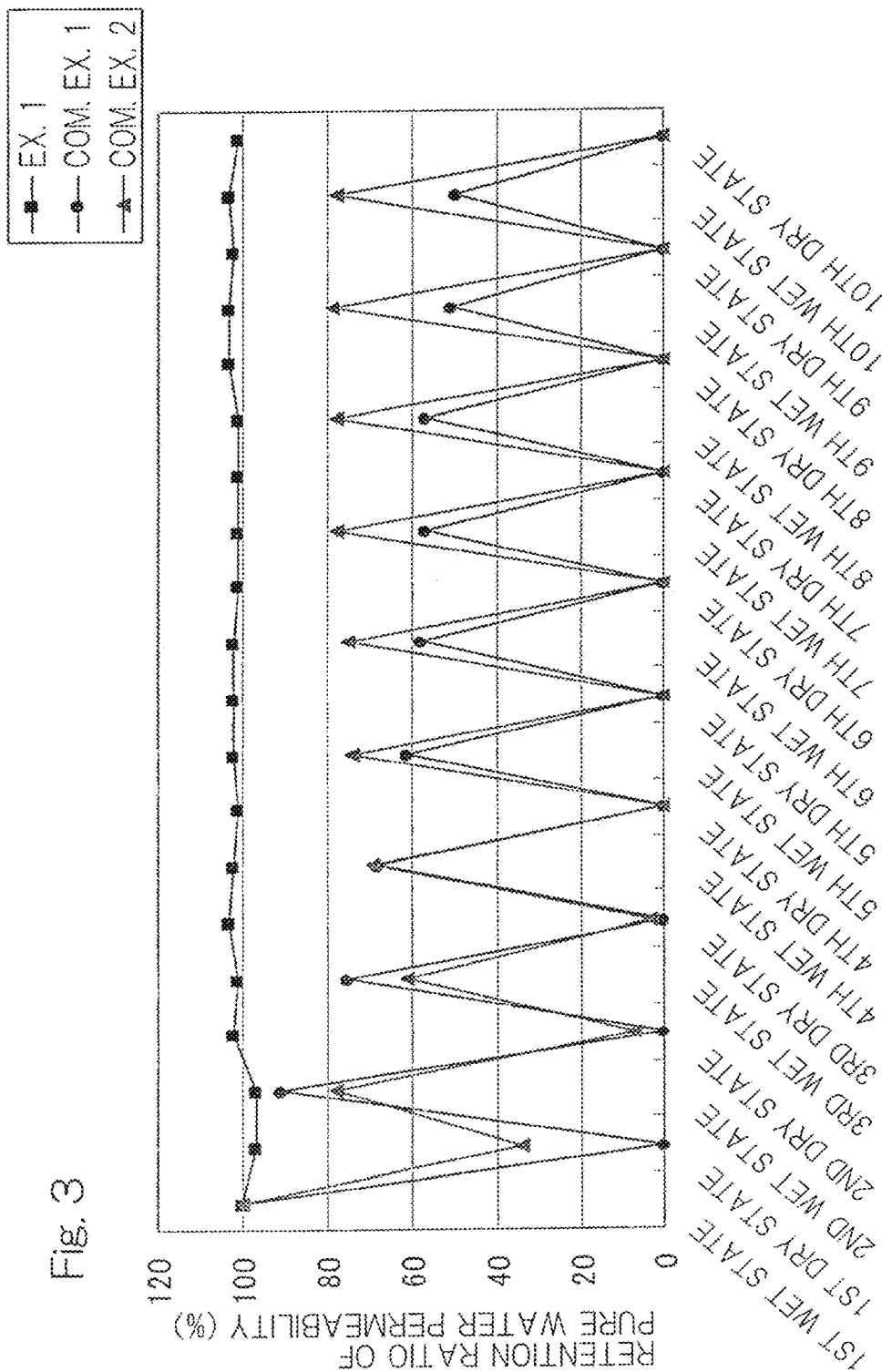
FIG. 3 is a graph showing retention ratio of pure water permeability of the hollow fiber membranes of Example 1 under dry or wet state.
Figures 1, 4:
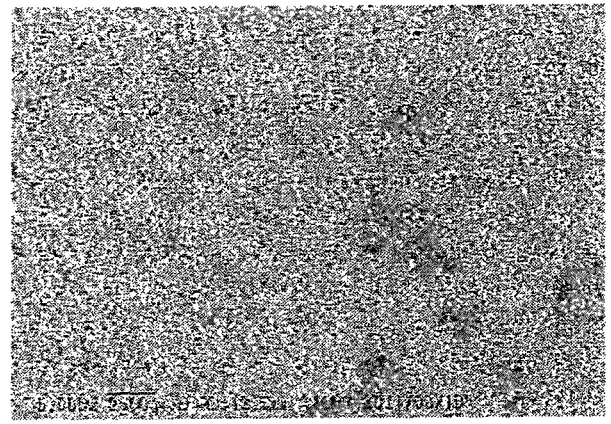
Figures 2, 4:
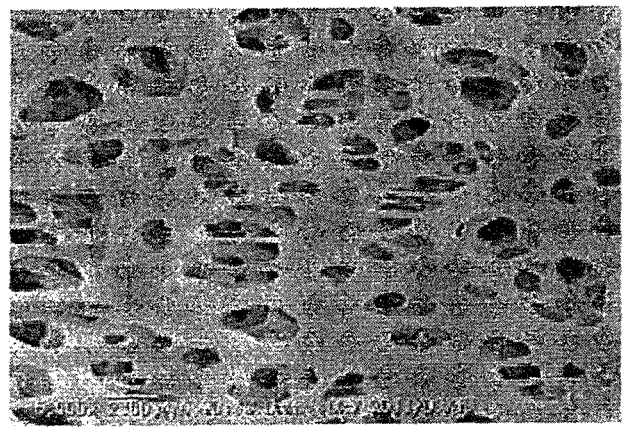
Figures 3, 4:
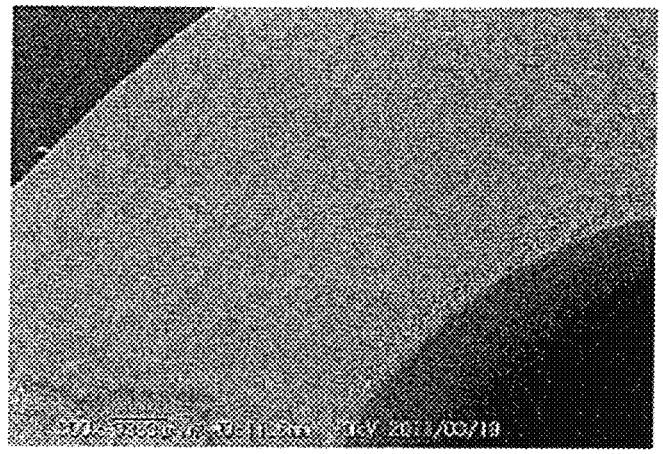

Using the hollow fiber membrane that was subjected to repeated exposure in alternative dry state and wet state, the retention of the pure water permeation rate was tested. FIG. 3 shows the obtained test results. As shown in the test results, even if the dry state and the wet state were alternately repeated 10 times, the 10th pure water permeation rate was not reduced compared with the 1st pure water permeation rate.

Example 2

Except for using a mixed solution containing 2 parts by weight of polyvinyl alcohol, 78.4 parts by weight of dimethylacetamide, and 19.6 parts by weight of glycerin, where the SP value ($\delta(i, c)$) of the mixture of DMAC and glycerin was 25.4 $(MPa)^{1/2}$, instead of the internal coagulating liquid of Example 1, a hollow fiber membrane was produced in the same way as Example 1. Table 2 shows the test results of the produced hollow fiber membrane.

The surface XPS analysis of the outer surface, the central portion, and the inner surface of the hollow fiber membrane revealed that the hydrophilic resin was approximately uniformly distributed in the membrane.

Example 3

Except for using a mixed solution containing 2 parts by weight of polyvinyl alcohol, 53.9 parts by weight of dimethylformamide ("DMF" manufactured by Mitsubishi Gas Chemical Co.), and 44.1 parts by weight of glycerin, where the SP value ($\delta(i, c)$) of the mixture of DMF and glycerin was 29.9 $(MPa)^{1/2}$, instead of the internal coagulating liquid of Example 1, a hollow fiber membrane was produced in the same way as Example 1. Table 2 shows the test results of the produced hollow fiber membrane.

The surface XPS analysis of the outer surface, the central portion, and the inner surface of the hollow fiber membrane revealed that the hydrophilic resin was approximately uniformly distributed in the membrane.

Example 4

Except for using a mixed solution containing 2 parts by weight of polyvinyl alcohol, 44.1 parts by weight of dimethylformamide (DMF), and 53.9 parts by weight of glycerin, where the SP value ($\delta(i, c)$) of the mixture of DMF and glycerin was 31.1 $(MPa)^{1/2}$, instead of the internal coagulating liquid of Example 1, a hollow fiber membrane was produced in the same way as Example 1. Table 2 shows the test results of the produced hollow fiber membrane.

The surface XPS analysis of the outer surface, the central portion, and the inner surface of the hollow fiber membrane revealed that the hydrophilic resin was approximately uniformly distributed in the membrane.

Example 5

Figures 1, 5:
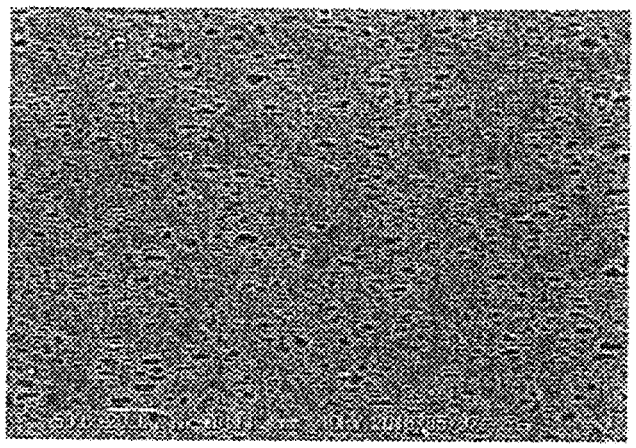
Figures 2, 5:
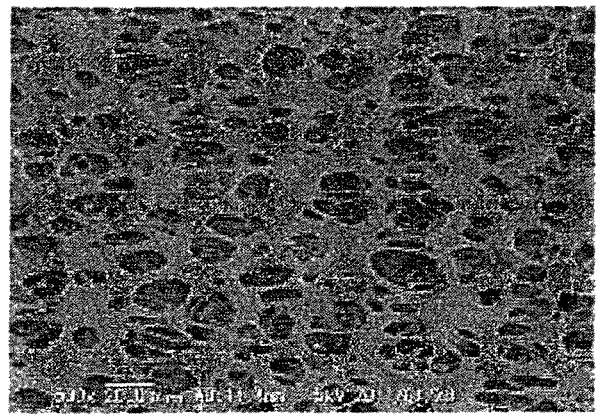
Figures 3, 5:
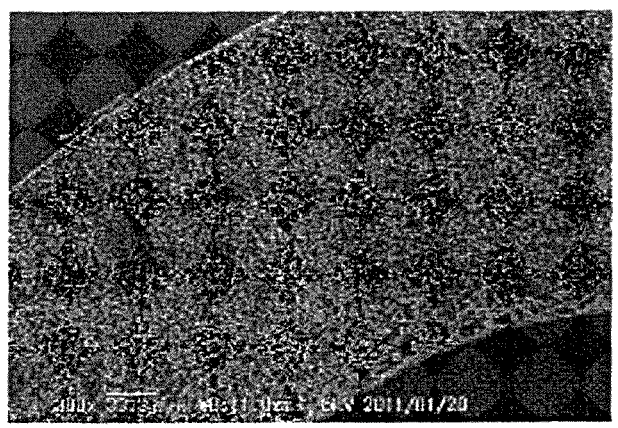

A spinning liquid was prepared except for using glycerin and silica ("Fine Seal F80" manufactured by Tokuyama Corporation) instead of the aggregater and the inorganic particles in Example 1, respectively, rendering the spinning liquid to contain 30 parts by weight of polyvinylidene fluoride, 36.5 parts by weight of γ-butyrolactone, 16.5 parts by weight of silica, and 17 parts by weight of glycerin, where the SP value ($\delta(s, c)$) of the mixture of GBL and glycerin was 29.4 $(MPa)^{1/2}$, and changing the temperature of the external coagulation bath into 65° C., a hollow fiber membrane was produced in the same way as Example 1. Table 2 shows the test results of the produced hollow fiber membrane. FIGS. 5-1 to 5-3 show scanning electron micrographs photographed at the observation of the membrane structure.

The surface XPS analysis of the outer surface, the central portion, and the inner surface of the hollow fiber membrane revealed that the hydrophilic resin was approximately uniformly distributed in the membrane.

Example 6

A spinning liquid was prepared except for using ethylene glycol ("ethylene glycol" manufactured by NIPPON SHOKUBAI CO., LTD.) instead of the aggregater in Example 1, and rendering the spinning liquid to contain 30 parts by weight of polyvinylidene fluoride, 29 parts by weight of γ-butyrolactone, 24 parts by weight of silica, and 17 parts by weight of ethylene glycol, where the SP value ($\delta(s, c)$) of the mixture of GBL and ethylene glycol was 29.9 $(MPa)^{1/2}$, a hollow fiber membrane was produced in the same way as Example 1. Table 2 shows the test results of the produced hollow fiber membrane.

The surface XPS analysis of the outer surface, the central portion, and the inner surface of the hollow fiber membrane revealed that the hydrophilic resin was approximately uniformly distributed in the membrane.

Example 7

Except for using a mixed solution containing 0.4 part by weight of polyvinyl alcohol, 59.8 parts by weight of dimethylacetamide (DMAC), and 38.8 parts by weight of glycerin, where the SP value ($S(i, c)$) of the mixture of DMAC and glycerin was 28.1 $(MPa)^{1/2}$, instead of the internal coagulating liquid of Example 1, a hollow fiber membrane was produced in the same way as Example 1. Table 2 shows the test results of the produced hollow fiber membrane. The retention ratio of the pure water permeation rate ($FLUX_d/FLUX_w$) was 80.5%, the obtained value being 80% or more.

The surface XPS analysis of the outer surface, the central portion, and the inner surface of the hollow fiber membrane revealed that the hydrophilic resin was approximately uniformly distributed in the membrane.

Comparative Example 1

Except for using a mixed solution containing 60 parts by weight of dimethylacetamide (DMAC) and 40 parts by weight of glycerin, where the SP value (δ(i, c)) of the mixture of DMAC and glycerin was 28.1 (MPa)$^{1/2}$, instead of the internal coagulating liquid of Example 1, a hollow fiber membrane was produced in the same way as Example 1. Table 2 shows the test results of the produced hollow fiber membrane. As shown in the test results, where the hollow fiber membrane did not contain the polyvinyl alcohol, water did not permeate the membrane in the dry state.

Comparative Example 2

Except for using a mixed solution containing 60 parts by weight of dimethylacetamide (DMAC) and 40 parts by weight of glycerin, where the SP value (δ(i, c)) of the mixture of DMAC and glycerin was 28.1 (MPa)$^{1/2}$, instead of the internal coagulating liquid of Example 1, and using a 20 wt % aqueous solution of sodium sulfate containing 5 wt % polyvinyl alcohol ("PVA-205" manufactured by Kuraray Co., Ltd.) instead of the external coagulation bath of Example 1, a hollow fiber membrane was produced in the same way as Example 1 so as to render the hollow fiber membrane be hydrophilized only on the outer surface. Table 2 shows the test results of the produced hollow fiber membrane.

By using thus obtained hollow fiber membrane, the protein adsorption test was conducted in the manner as in Example 1. FIG. 1 shows the obtained results. Compared with the hollow fiber membrane of Example 1, the hollow fiber membrane of Comparative Example 2 had about 4-time more protein adsorption to show deteriorated fouling resistance.

By using the above-obtained hollow fiber membrane in Comparative Example 2, a membrane filtering device 1 as shown in FIG. 7 was produced. The filtration was operated in the same way as Example 1. The hollow fiber membrane of Comparative Example 2 showed increased transmembrane pressure by 20 days. In comparison with the hollow fiber membrane of Example 1, the membrane of Comparative Example 2 showed reduced fouling resistance and rapid clogging. FIG. 2 shows the obtained results.

Using the hollow fiber membrane that was subjected to alternately repeated dry state and wet state, the retention of the pure water permeation rate was tested. FIG. 3 shows the obtained test results. As shown in the test results, where the coagulation bath containing polyvinyl alcohol to hydrophilize the hollow fiber membrane only on outer surface, the retention ratio of the membrane in the dry state was 38%. As a result, sufficient water permeability was not achieved. Moreover, after repeating the dry state and the wet state alternately 10 times, water did not permeate the hollow fiber membrane in the dry state.

Comparative Example 3

Figures 1, 6:
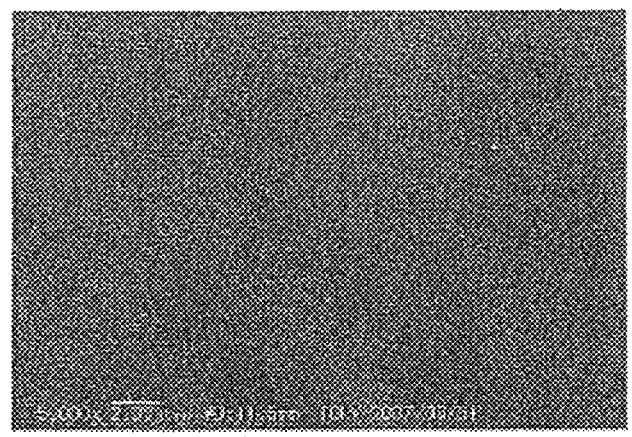
Figures 2, 6:
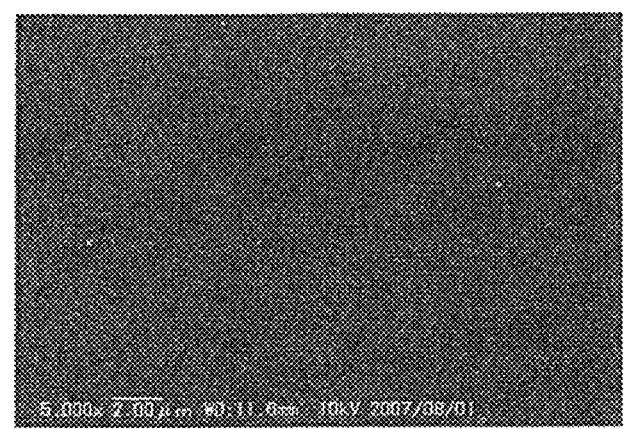
Figures 3, 6:
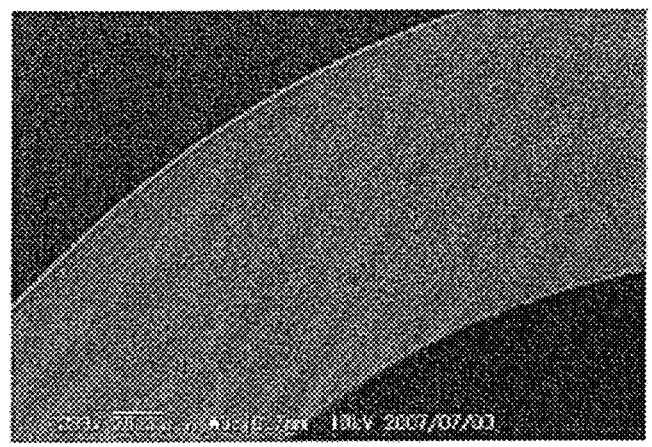

Except for using a mixed solution containing 2 parts by weight of polyvinyl alcohol, 4.9 parts by weight of dimethylacetamide (DMAC) and 93.1 parts by weight of glycerin, where the SP value (δ(i, c)) of the mixture of DMAC and glycerin was 35.5 (MPa)$^{1/2}$, as the internal coagulating liquid, a hollow fiber membrane was produced in the same way as Example 1. Table 2 shows the test results of the produced hollow fiber membrane. FIGS. 6-1 to 6-3 show scanning electron micrographs photographed at the observation of the membrane structure. As shown in the test results, where the hollow fiber membrane had an average pore ratio Pi/Po (ratio of the inner surface average pore relative to the outer surface average pore) was out of the range, the membrane did not have a gradient structure so that the pure water permeation rate was deteriorated.

TABLE 2

| | Ex 1 | Ex 2 | Ex 3 | Ex 4 | Ex 5 | Ex 6 | Ex 7 | Com Ex 1 | Com Ex 2 | Com Ex 3 |
|---|---|---|---|---|---|---|---|---|---|---|
| Average pore size | | | | | | | | | | |
| Po (μm) | 0.07 | 0.07 | 0.07 | 0.07 | 0.87 | 1.25 | 0.07 | 0.07 | 0.07 | 0.04 |
| Pi (μm) | 2.3 | 2.89 | 1.44 | 0.72 | 6.9 | 7.6 | 2.3 | 2.3 | 2.3 | 0.08 |
| Ratio of Pi/Po | 32.9 | 41.3 | 20.6 | 10.3 | 7.9 | 6.1 | 32.9 | 32.9 | 32.9 | 2 |
| Surface pore ratio of outer surface (%) | 23.9 | 23.9 | 24 | 23.9 | 19.7 | 20.2 | 23.9 | 23.9 | 23.9 | 23.9 |
| Surface pore ratio of inner surface (%) | 28.4 | 28.4 | 28 | 28 | 31.3 | 33.4 | 28.4 | 28.4 | 28.4 | 27.8 |
| Fraction particle size (μm) | 0.02 | 0.02 | 0.02 | 0.02 | 2 | 3 | 0.02 | 0.02 | 0.02 | 0.02 |
| Pure water permeation rate (L/m$^2$/hr/98 kPa) | | | | | | | | | | |
| FLUX$_w$ | 1490 | 1650 | 1400 | 1260 | 98000 | 135000 | 1200 | 1490 | 1490 | 780 |
| FLUX$_d$ | 1488 | 1650 | 1399 | 1257 | 98000 | 134900 | 1490 | 0 | 566 | 770 |
| Retention ratio of pure water permeation rate (%) | | | | | | | | | | |
| (FLUX$_w$/FLUX$_d$) × 100 | 99.9 | 99.9 | 99.9 | 99.8 | 100 | 99.9 | 80.5 | 0 | 38 | 98.7 |
| (FLUX$_{d10}$/FLUX$_w$) × 100 | 99.9 | 100 | 99.9 | 99.8 | 100 | 99.9 | 81.0 | 0 | 0 | 98.7 |
| PVA content (wt %) | 5.7 | 5.2 | 6.4 | 7.8 | 3 | 3.5 | 1.0 | 0 | 0.3 | 8.2 |

INDUSTRIAL APPLICABILITY

According to the present invention, vinylidene fluoride resin porous hollow fiber membranes being capable of having good fouling resistance, high permeability, high fractionation performance, and good process controllability can be obtained. Such hollow fiber membranes are industrially applicable to various industrial fields, for example, fields of water treatment such as water purification, drinking water production, industrial water production, and wastewater treatment, to fields of membrane-employing fields such as fields of food industry, and to fields of membrane producing, to fields of other fields producing membrane-processing equipment, and to other fields.

As has been described with preferred embodiments with reference to the accompanying drawings, those skilled in the art, looking at this specification, it will readily envision various changes and modifications within the obvious range.

Accordingly, such changes and modifications, be construed as within the scope of the invention as defined from the scope of the claims.

What is claimed is:

1. A vinylidene fluoride porous hollow fiber membrane comprising:
    a vinylidene fluoride resin and a hydrophilic resin,
    wherein the hydrophilic resin is an ethylene-vinyl alcohol or a polyvinyl alcohol, and is contained at a concentration of from 0.5 to 10% by weight based on the weight of the vinylidene fluoride porous hollow fiber membrane;
    the hydrophilic resin is approximately uniformly distributed in a membrane cross-sectional direction of the vinylidene fluoride porous hollow fiber membrane; and
    a ratio Pi/Po is from 2.5 to 50.0 where Pi and Po denote an average pore size on an inner surface (Pi) of the vinylidene fluoride porous hollow fiber membrane and an average pore size on an outer surface (Po) of the vinylidene fluoride porous hollow fiber membrane, respectively, and
    a pure water permeation rate of the vinylidene fluoride porous hollow fiber membrane satisfies the formula:

$(FLUX_d/FLUX_w) \times 100 \geq 40.0$ wherein $FLUX_d$ represents a pure water permeation rate (L/m²/hr/98 kPa) of the vinylidene fluoride porous hollow fiber membrane in a dry state, and $FLUX_w$ represents a pure water permeation rate (L/m²/hr/98 kPa) of the vinylidene fluoride porous hollow fiber membrane in a wet state.

2. The vinylidene fluoride porous hollow fiber membrane according to claim 1, wherein a ratio of outer surface pore open area to total outer surface area of the vinylidene fluoride porous hollow fiber membrane is from 5% to 40%, and a fraction particle size of the vinylidene fluoride porous hollow fiber membrane ranges from 0.01 μm to 5.0 μm.

3. The vinylidene fluoride porous hollow fiber membrane according to claim 1, wherein a difference in a ratio of peak area resulting from oxygen 1S orbital obtained in XPS elemental compositional analysis at the outer surface and at the inner surface is within a range of ±10% based on the peak area ratio at the center of the hollow fiber membrane.

4. A method for producing the vinylidene fluoride resin porous hollow fiber membrane of claim 1, comprising:
    bringing a spinning liquid containing the vinylidene fluoride resin, a solvent, inorganic particles, and an aggregater, into contact with an external coagulating liquid and an internal coagulating liquid,
    wherein the internal coagulating liquid contains the hydrophilic resin at a concentration of 0.1 to 15% by weight based on the internal coagulating liquid and has a lower coagulating property than the external coagulating liquid, and
    the internal coagulating liquid is at a temperature of from 80° C. to 170° C.;
    wherein the porous hollow fiber membrane comprises the vinylidene fluoride resin and the hydrophilic resin,
    the hydrophilic resin is contained at a concentration of from 0.5 to 10% by weight based on the weight of the vinylidene fluoride porous hollow fiber membrane;
    the hydrophilic resin is approximately uniformly distributed in a membrane cross-sectional direction of the vinylidene fluoride porous hollow fiber membrane; and
    a ratio Pi/Po is from 2.5 to 50.0 where Pi and Po denote an average pore size on an inner surface (Pi) of the vinylidene fluoride porous hollow fiber membrane and an average pore size on an outer surface (Po) of the vinylidene fluoride porous hollow fiber membrane, respectively, and
    a pure water permeation rate of the vinylidene fluoride porous hollow fiber membrane satisfies the formula:

$(FLUX_d/FLUX_w) \times 100 \geq 40.0$ wherein $FLUX_d$ represents a pure water permeation rate (L/m²/hr/98 kPa) of the vinylidene fluoride porous hollow fiber membrane in a dry state, and $FLUX_w$ represents a pure water permeation rate (L/m²/hr/98 kPa) of the vinylidene fluoride porous hollow fiber membrane in a wet state.

5. The method according to claim 4, wherein the spinning liquid extruded from a spinneret enters a dry spinning zone and then an extruded fibrous material is brought into contact with the external coagulating liquid.

6. The method according to claim 5, wherein
    a three-dimensional solubility parameter δ (s, c) of the spinning liquid is from 21 to 33 (MPa$^{1/2}$), and
    a three-dimensional solubility parameter δ (i, c) of the internal coagulating liquid is from 23 to 35 (MPa$^{1/2}$).

7. The method according to claim 4, wherein
    a three dimensional solubility parameter δ (s, c) of the spinning liquid is from 21 to 33 (MPa$^{1/2}$), and
    a three dimensional solubility parameter δ (i, c) of the internal coagulating liquid is from 23 to 35 (MPa$^{1/2}$).

* * * * *